(12) United States Patent
Peregoy

(10) Patent No.: US 11,311,780 B2
(45) Date of Patent: Apr. 26, 2022

(54) GOLF BALL COMPRISING A LIGHTWEIGHT CORE

(71) Applicant: Kelley Peregoy, Lillington, NC (US)

(72) Inventor: Kelley Peregoy, Lillington, NC (US)

( * ) Notice: Subject to any disclaimer, the term of this patent is extended or adjusted under 35 U.S.C. 154(b) by 0 days.

(21) Appl. No.: 17/286,664

(22) PCT Filed: Sep. 1, 2020

(86) PCT No.: PCT/US2020/048945
§ 371 (c)(1),
(2) Date: Apr. 19, 2021

(87) PCT Pub. No.: WO2021/046056
PCT Pub. Date: Mar. 11, 2021

(65) Prior Publication Data
US 2021/0387056 A1 Dec. 16, 2021

Related U.S. Application Data

(60) Provisional application No. 62/897,245, filed on Sep. 6, 2019, provisional application No. 62/956,946, filed on Jan. 3, 2020, provisional application No. 62/959,663, filed on Jan. 10, 2020, provisional application No. 62/987,819, filed on Mar. 10, 2020, provisional application No. 63/009,540, filed on Apr.
(Continued)

(51) Int. Cl.
*A63B 37/06* (2006.01)
*A63B 37/00* (2006.01)
*B29C 43/30* (2006.01)
*B29C 45/00* (2006.01)
*B29C 45/14* (2006.01)
*B29L 31/54* (2006.01)

(52) U.S. Cl.
CPC ...... *A63B 37/0039* (2013.01); *A63B 37/0004* (2013.01); *A63B 37/0024* (2013.01); *A63B 37/0033* (2013.01); *A63B 37/0045* (2013.01); *A63B 37/0047* (2013.01); *A63B 37/0051* (2013.01); *A63B 37/0066* (2013.01); *A63B 37/0076* (2013.01); *B29C 43/305* (2013.01); *B29C 45/0001* (2013.01); *B29C 45/14778* (2013.01); *B29C 45/14819* (2013.01); *B29L 2031/546* (2013.01)

(58) Field of Classification Search
CPC ............ A63B 37/0015; A63B 37/0005; A63B 37/0004
USPC .................................................. 473/378, 383
See application file for complete search history.

(56) References Cited

U.S. PATENT DOCUMENTS

| | | | | |
|---|---|---|---|---|
| 5,536,013 | A | * | 7/1996 | Pocklington ....... A63B 37/0004 473/384 |
| 7,326,131 | B2 | * | 2/2008 | Sajima ............... A63B 37/0004 473/383 |

(Continued)

*Primary Examiner* — Raeann Gorden
(74) *Attorney, Agent, or Firm* — Ashley D. Johnson; Dogwood Patent and Trademark Law

(57) ABSTRACT

The presently disclosed subject matter is directed to a golf ball providing improve play characteristics. The disclosed golf ball includes an outer cover comprising a plurality of divots. The disclosed golf ball further includes a central core comprising one or more lightweight materials, such as aerogel. The combination of the lightweight core and the unique divots enable the golf ball to go farther and straighter when hit by the golfer, thereby providing increased performance.

17 Claims, 8 Drawing Sheets

Related U.S. Application Data

14, 2020, provisional application No. 63/015,880, filed on Apr. 27, 2020.

(56) References Cited

U.S. PATENT DOCUMENTS

| | | | |
|---|---|---|---|
| 7,867,109 B2* | 1/2011 | Sullivan | A63B 37/0006 |
| | | | 473/383 |
| 2002/0098914 A1 | 7/2002 | Calabria | |
| 2004/0048689 A1* | 3/2004 | Nesbitt | A63B 37/0003 |
| | | | 473/367 |
| 2006/0166761 A1* | 7/2006 | Kim | A63B 37/0063 |
| | | | 473/371 |
| 2011/0098135 A1* | 4/2011 | Ono | A63B 37/0019 |
| | | | 473/383 |
| 2018/0008867 A1* | 1/2018 | Sullivan | A63B 37/0076 |

* cited by examiner

GOLF BALL COMPRISING A LIGHTWEIGHT CORE

CROSS-REFERENCE TO RELATED APPLICATIONS

The current application claims priority to U.S. Provisional Patent Application Nos. 62/897,245 filed Sep. 6, 2019; 62/956,946 filed Jan. 3, 2020; 62/959,663 filed Jan. 10, 2020; 62/987,819 filed Mar. 10, 2020; 63/009,540 filed Apr. 14, 2020; and 63/015,880 filed Apr. 27, 2020, the entire contents of which are hereby incorporated by reference.

TECHNICAL FIELD

The presently disclosed subject matter is directed to a golf ball comprising a lightweight core material. The disclosed golf ball further optionally includes a plurality of shaped divots positioned about the outer surface of the ball.

BACKGROUND

Golf balls were originally constructed with smooth outer surfaces. However, in the late nineteenth century, players observed that older golf balls traveled further. As a result, players began to roughen the surface of new golf balls to increase flight distance. By the mid-1900s, the vast majority of manufactured golf balls included indentations arranged in an octahedral pattern on the ball surface (about 60% of the outer surface was covered by dimples). In 1983, Titleist introduced a golf ball that had 384 dimples arranged in an icosahedral pattern (about 76% of the ball outer surface was covered by dimples). Current dimpled golf balls travel nearly two times farther than a similar ball without dimples.

The dimples on a golf ball are important in reducing drag and providing lift. "Drag" refers to the air resistance that acts on the golf ball when the ball is in flight. As the ball travels, the air surrounding the ball exerts an initial maximum pressure on the front of the ball. Air then flows over the sides of the ball with increased velocity and reduced pressure. At some point, the air separates from the surface of the ball, leaving a large area of low-pressure turbulent flow behind the ball ("the wake"). The difference between the high-pressure area in front of the ball and the low pressure area behind the ball functions to slow down the golf ball, creating the primary source of drag.

Advantageously, the dimples on a golf ball create a turbulent boundary layer around the ball perimeter. The turbulence ensures that the boundary layer remains attached to the surface around the ball to reduce the area of the wake. As a result, the pressure behind the ball is increased to substantially reduce drag.

Dimples further function to increase the golf ball lift during use. Specifically, "lift" refers to the upward force on the ball that is created from a difference in pressure between the top and bottom surfaces of the ball. The difference in pressure results from the air flow created by the backspin of the ball. Specifically, the top of the ball moves with the air flow, which delays the separation to a point further rearward. However, the bottom of the ball moves against the air flow, advancing the separation point forward. Such asymmetrical separation creates an arch in the flow pattern, requiring the air over the top of the ball to move faster, and thus have lower pressure than the air underneath the ball.

In addition, the core of the golf ball can affect a player's drive. Rubber compositions formulated to possess high hardness and high compressive strengths are commonly used as golf ball cores. Polybutadiene elastomer crosslinked with zinc salt of acrylic or methacrylic acid is commonly used as the main component of a core to increase ball hardness. Such golf balls are typically resilient but tend to be less durable. Similarly, golf ball core materials crosslinked by methacrylic acid zinc salts produce a ball of superior durability but at the expense of resilience.

While the industry has witnessed dramatic changes and improvements to golf equipment in recent years, players continue to look for increased distance and/or improved spin control on their golf shots. It would therefore be beneficial to provide a golf ball with improved characteristics.

SUMMARY

In some embodiments, the presently disclosed subject matter is directed to a golf ball comprising an inner core comprising one or more ultralightweight materials, and a substantially spherical outer cover comprising a plurality of divots.

In some embodiments, the ultralightweight materials are selected from silica aerogel, aerogel, Airloy, or combinations thereof.

In some embodiments, the ultralightweight material is blended with one or more elastomer, rubber, or polymeric material.

In some embodiments, the ultralightweight material has a density of less than about 1 g/cc.

In some embodiments, the aerogel comprises greater than 99% air, based on the total weight of the aerogel.

In some embodiments, the core layer comprises one or more thermally resistant materials.

In some embodiments, the golf ball further comprises first and second intermediate layers positioned between the core layer and the outer cover.

In some embodiments, the first and second intermediate layers comprise one or more of the following urethane, ionomer resin, TPU, polybutadiene, natural or synthetic balata, rubber, elastomeric material, methacrylic acid, acrylic acid, ethylene, polyurethane, polyamide resin, polyester resin, polyurethane resin, aerogel, Airloy®, thermoset materials, or combinations thereof.

In some embodiments, the first and second intermediate layers have a thickness of about 0.01-1.0 inches. The thickness refers to a perpendicular measurement that spans the two adjacent layers.

In some embodiments, the outer cover comprises one or more of urethane, sodium ionomer resin, zinc ionomer resin, lithium ionomer resin, thermoplastic polyurethane (TPU), polybutadiene, natural or synthetic balata (trans polyisoprene), rubber, polyoctenylene, butadiene, chloroprene, methacrylic acid, acrylic acid, ethylene, polyurethane, or copolymers thereof.

In some embodiments, the outer cover has a thickness of about 0.01-0.05 inches.

In some embodiments, the golf ball further comprises a coating layer positioned exterior to the outer cover, wherein the coating layer comprises polyurethane, polyester, acrylic, low acid thermoplastic ionomer, or combinations thereof.

In some embodiments, the divots each comprise an indentation and a land portion that is level with the outer cover of the golf ball.

In some embodiments, the presently disclosed subject matter is directed to a method of making a golf ball. Particularly, the method comprises forming a spherical inner core comprising one or more ultralightweight materials, optionally forming one or more intermediate layers around the inner core layer using a molding or lamination process, inserting the structure into a mold comprising a desired divot pattern, injecting the mold with an outer cover material, cooling the cover material, and ejecting the golf ball from the mold.

In some embodiments, the ultralightweight materials are selected from the aerogels are selected from silica aerogel, Airloy, or combinations thereof.

In some embodiments, the ultralightweight material is blended with one or more elastomer, rubber, or polymeric material.

In some embodiments, the ultralightweight material has a density of less than about 1 g/cc.

In some embodiments, the method further comprises a painting or coating step applied to the outer surface of the golf ball.

In some embodiments, the cover comprises one or more of urethane, sodium ionomer resin, zinc ionomer resin, lithium ionomer resin, thermoplastic polyurethane (TPU), polybutadiene, natural or synthetic balata (trans polyisoprene), rubber, polyoctenylene, butadiene, chloroprene, methacrylic acid, acrylic acid, ethylene, polyurethane, or copolymers thereof.

In some embodiments, the divots each comprise an indentation and a land portion that is level with the outer cover of the golf ball. Each divot is defined by an indentation surrounding a central stem, wherein the central stem is flush with the land on the outer cover. Each indentation is defined by an outer edge that is adjacent to the land on the outer cover and an inner edge that is adjacent to the divot central portion.

In some embodiments, the divot indentation has a depth of about 0.015-0.40 inches.

In some embodiments, the inner and outer indentation edges are configured to be circular in shape.

In some embodiments, the inner and outer indentations are configured to be oval, triangular, square, rectangular, diamond, clover, or abstract in shape.

In some embodiments, the inner and outer indentations differ in shape relative to each other.

In some embodiments, the divot comprises an outer diameter of about 0.05-0.15 inches.

In some embodiments, the divot comprises an inner diameter of about 0.04-0.12 inches.

In some embodiments, the golf ball comprises about 200-400 divots.

In some embodiments, the divots span about 60-90 percent of the golf ball outer surface.

BRIEF DESCRIPTION OF THE DRAWINGS

The previous summary and the following detailed descriptions are to be read in view of the drawings, which illustrate some (but not all) embodiments of the presently disclosed subject matter.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−1%, from the specified amount, as such variations are appropriate in the disclosed packages and methods.

For purposes of this application, the terms "inner" refer to the direction towards to the core of a golf ball. Similarly, "outer" refers to the direction towards the cover or visible/touchable surface of a golf ball.

Figure 1A:
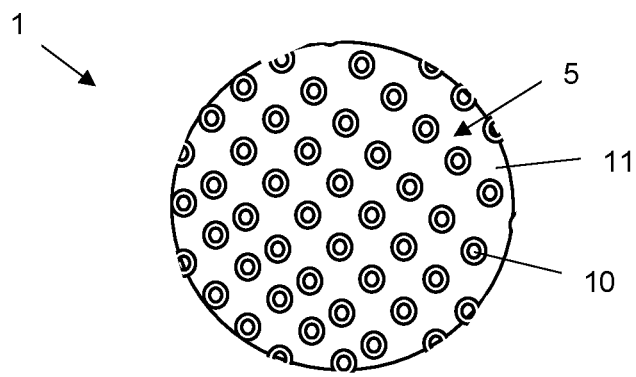
FIG. 1a is a front plan view of a golf ball in accordance with some embodiments of the presently disclosed subject matter.
Figure 1B:
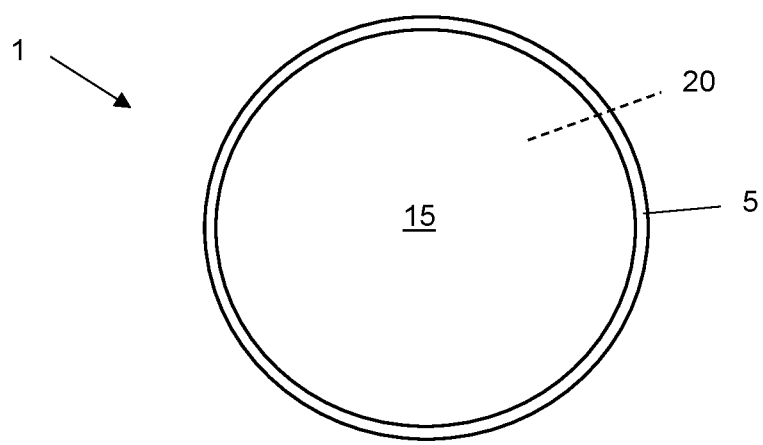
FIG. 1b is a fragmentary view of a golf ball, sliced in half.

FIG. 1a illustrates a golf ball in accordance with some embodiments of the presently disclosed subject matter. The term "golf ball" as used herein refers to any generally spherically shaped ball that can be used in playing the game of golf. As shown, golf ball 1 can include cover 5 comprising a plurality of divots 10 and land 11. Land 11 forms a matrix surrounding the divots. As shown in FIG. 1b, ball 1 can further include central core 15 that comprises one or more lightweight materials 20. The term "core" refers to the portion of a golf ball that is close to or proximate to the center of the golf ball. The core 15 and/or divots 10 enable the golf ball to go farther and straighter when hit by the golfer, as set forth in more detail below. In some embodiments, a golf ball in accordance with the presently disclosed subject matter can include a lightweight core without divots as disclosed herein (e.g., standard golf ball divots can be used).

Figure 2A:
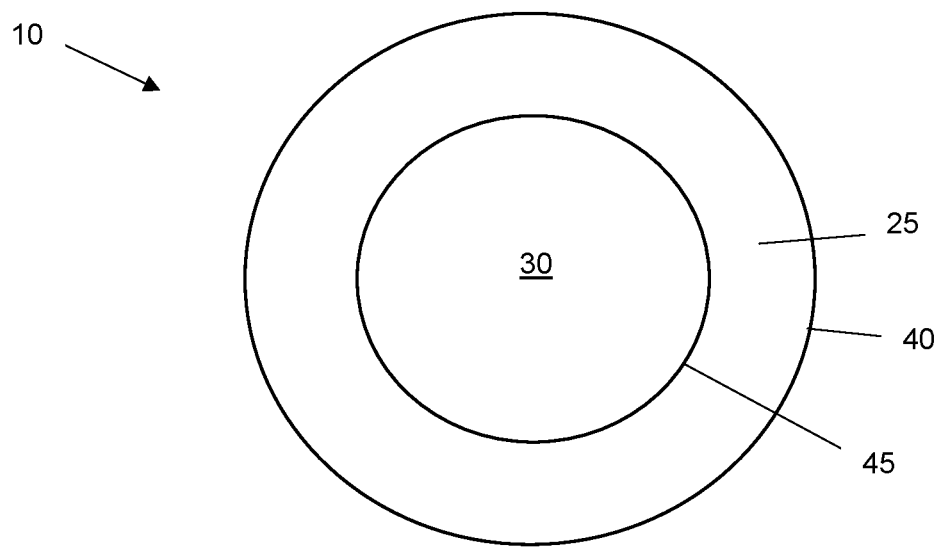
FIG. 2a is a top plan view of a golf ball divot in accordance with some embodiments of the presently disclosed subject matter.

In some embodiments, golf ball 1 includes a plurality of divots disposed about the ball cover. The golf ball cover refers to the exterior surface of the golf ball. As shown in FIG. 2a, each divot 10 can be defined by indentation 25 surrounding central stem 30 that is flush with land 11 on the cover of the golf ball. The term "indentation" as used herein refers to a recess in golf ball cover 5. Each indentation 25 includes outer edge 40 that is adjacent to land 11 on cover 5, and inner edge 45 positioned directly adjacent to stem 30. Inner and outer edges 40, 45 form the boundaries of indentation 25.

Figure 2B:
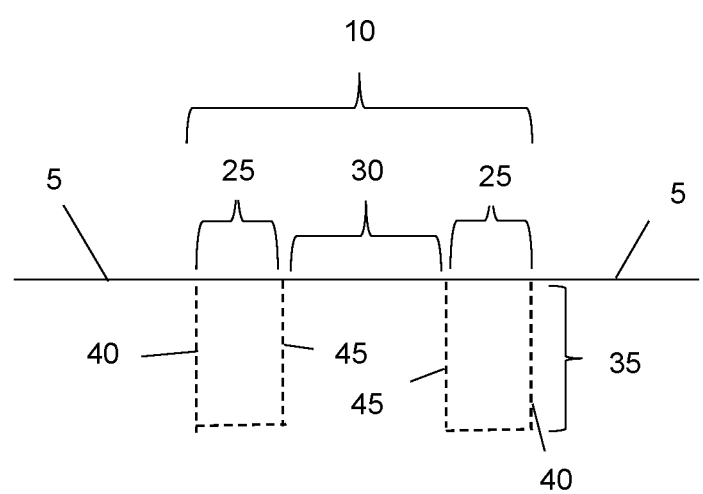
FIGS. 2b-2d are side plan views of golf ball divots in accordance with some embodiments of the presently disclosed subject matter.

Indentation 25 extends toward the inner (core) surface of the ball with depth 35 of about 0.025 inches, as illustrated in FIG. 2b. Thus, each indentation can have a depth of at least about (or no more than about) 0.005, 0.010, 0.015, 0.016, 0.017, 0.018, 0.019, 0.020, 0.021, 0.022, 0.023, 0.024, 0.025, 0.026, 0.027, 0.028, 0.029, 0.030, 0.031, 0.032, 0.033, 0.034, 0.035, 0.036, 0.037, 0.038, 0.039, or 0.040 inches. However, it should be appreciated that depth 35 is not limited to the ranges set forth above and the indentation can be greater than 0.040 inches and/or less than 0.005 inches.

In some embodiments, each divot 10 on golf ball cover 5 is configured to have about the same depth. However, in some embodiments, one or more divots can differ in depth compared to at least one other divot. In some embodiments, divots of the same type can be positioned in a pattern as desired by the user (e.g., on one side of the golf ball or about a circumference). Thus, the divots about the circumference of the golf ball can differ in regard to size, indentation, or both when compared to at least one other portion of the ball. In some embodiments, the ball can include divots with 2 or more different depths.

Figure 2C:
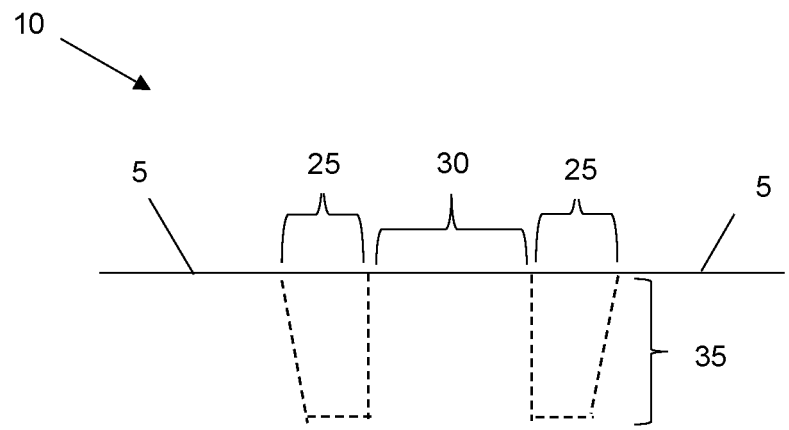
Figure 2D:
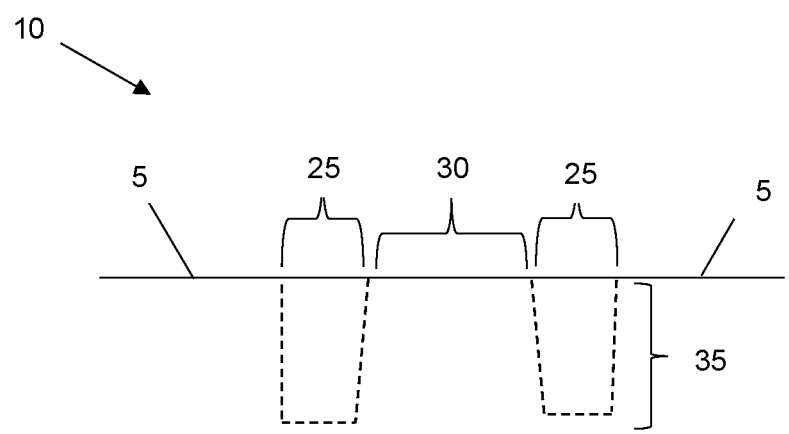

In some embodiments, the inner and/or outer edges of indentation 25 can be angled relative to the outer surface of the ball (e.g., land 11). For example, FIGS. 2c and 2d illustrate indentations 25 with an edge angled at 30 degrees and 10 degrees, respectively. It should be appreciated that the inner and/or outer edge of the indentation can include an acute or obtuse angle, relative to land portion 11 of golf ball 1. The angle can therefore be configured at about 5-175 degrees (e.g., about 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, or 175 degrees). However, in some embodiments, the indentation is not angled relative to the outer surface of the ball. In some embodiments, the indentation can be curved or shaped relative to the outer surface of the ball (e.g., squared off, circular, rounded, triangular, etc.).

Although depicted as circular in the figures, the inner and/or outer edges of indentation 25 can be configured in any desired shape, such as (but not limited to) oval, square, rectangular, triangular, diamond, abstract, and the like, as illustrated in FIGS. 3a-3e. Any shape can be used. The outer shape of the indentation is thus defined by outer edge 40 (e.g., the outer perimeter of the indentation), where the surface begins to be depressed compared to the surrounding ball cover. Similarly, the inner shape of the indentation is defined by inner indentation edge 45 (e.g., the inner perimeter of the indentation), where the surface begins to be depressed compared to the adjacent stem 30. It should be appreciated that the shape of stem 30 is defined by the shape of indentation inner edge 45.

Figure 3A:
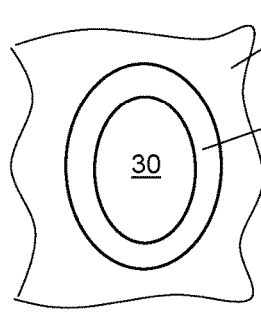
FIGS. 3a-3f are top plan view of golf ball divots in accordance with some embodiments of the presently disclosed subject matter.
Figure 3B:
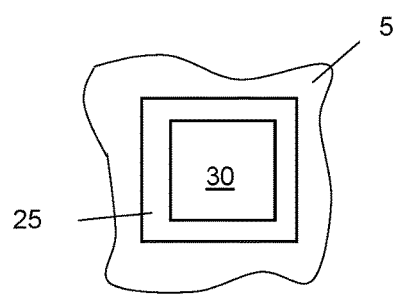
Figure 3C:
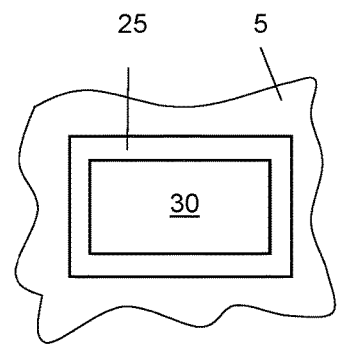
Figure 3D:
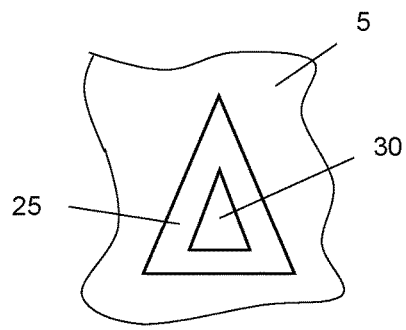
Figure 3E:
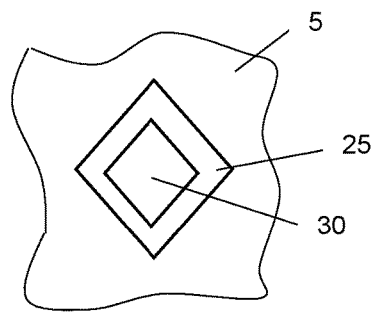
Figure 3F:
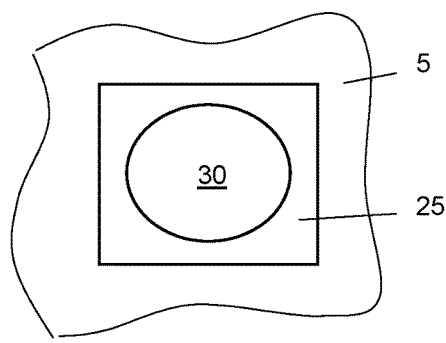

In some embodiments, the inner and outer indentation edges are configured to have the same or about the same shape. However, the presently disclosed subject matter is not limited, and the shapes of the inner and outer edges can differ, such as in the embodiment of FIG. 3f.

In some embodiments, each divot 10 on golf ball cover 5 is configured to have about the same size and/or shape. However, in some embodiments, one or more divots can differ in size and/or shape compared to at least one other divot. In some embodiments, the ball can include different size and/or shaped divots depending on the divot location (e.g., on a ball side, about a circumference, etc.). Any desired pattern can be used. In some embodiments, 2 or more different divots can be represented differing in size and/or shape. Any number of unique divots can be used.

Each divot 10 has a volume defined by the space carved out by the indentation and bounded by an imaginary line representing where the cover of golf ball 1 would be if no indentation were present. The aggregate volume of all indentations on the cover of golf ball 1 can range from about 400 mm$^3$ to about 800 mm$^3$. Thus, the aggregate indentation volume can be about 400, 425, 450, 475, 500, 525, 550, 575, 600, 625, 650, 675, 700, 725, 750, 775, or 800 mm$^3$. However, the presently disclosed subject matter is not limited to the range above, and the divot volume can be greater than 800 mm$^3$ and/or less than 400 mm$^3$. Each divot can have the same or about the same volume. Alternatively, at least one divot can have a volume greater or lesser than at least one other divot volume.

Figure 4A:
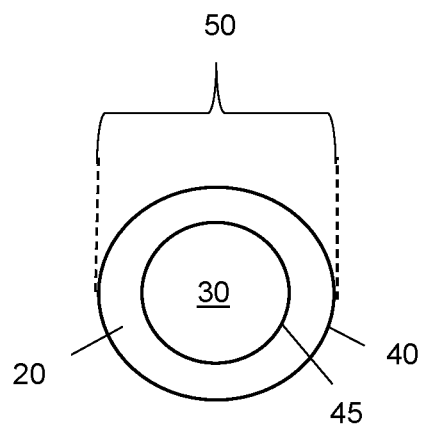
FIGS. 4a and 4b are top plan view of golf ball divots in accordance with some embodiments of the presently disclosed subject matter.
Figure 4B:
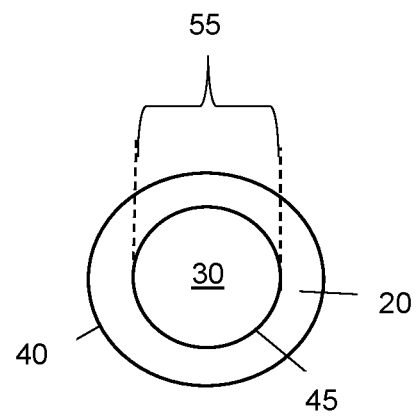

As shown in FIGS. 4a and 4b, divot 10 includes outer and inner diameters 50, 55. The term "outer diameter" refers a straight-line segment that passes through the center of the divot, where the endpoints of the straight-line segment are positioned on outer edge 40 of the divot indentation. The term "inner diameter" refers to a straight-line segment that passes through the center of the divot, where the endpoints of the straight-line segment are positioned on indentation inner edge 45. In some embodiments, outer diameter 50 can be about 0.05-0.15 inches, such as at least about 0.05, 0.06, 0.07, 0.08, 0.09, 0.10, 0.11, 0.12, 0.13, 0.14, or 0.15 inches. In some embodiments, inner diameter 55 can be about 0.04-0.12 inches, such as at least about (or no more than about) 0.040, 0.045, 0.050, 0.055, 0.060, 0.065, 0.070, 0.075, 0.08, 0.085, 0.090, 0.095, 0.10, 0.105, 0.11, 0.115, or 0.120 inches. It should be appreciated that inner diameter 55 is about the same as the diameter of stem 30. In some embodiments, the inner and outer diameters are not limited and can be greater than/less than the ranges given above.

Figure 5:
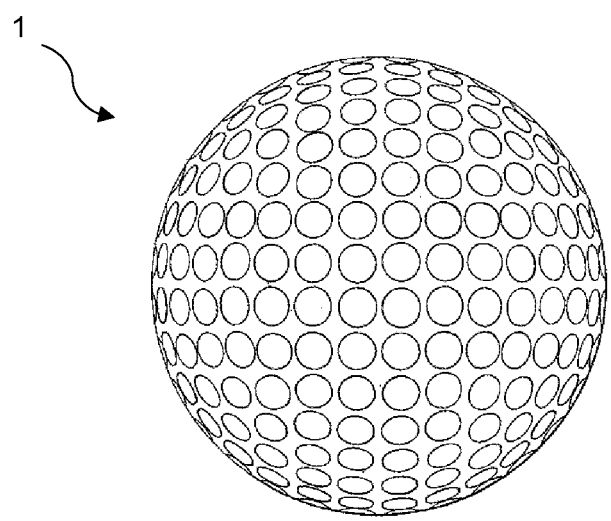
FIG. 5 is a perspective view of a golf ball with conventional divots.

Alternatively, the disclosed golf ball can include standard divots, such as those commonly used on conventional golf balls (e.g., such as those described in U.S. Pat. Nos. 5,879,244; 7,837,578; 4,611,810; 5,913,736; and 3,119,622, the entire contents of which are hereby incorporated by reference herein). One representative example of a golf ball with conventional divots is shown in FIG. 5.

Ball 1 can include any number of divots 10. For example, in some embodiments, cover 5 of the golf ball can have about 100-400 divots, such as at least about (or no more than about) 100, 110, 120, 130, 140, 150, 160, 170, 180, 190, 200, 210, 220, 230, 240, 250, 260, 270,280, 290, 300, 310, 320, 330, 340, 350, 360, 370, 380, 390, or 400 divots. However, the presently disclosed subject matter is not limited and ball 1 can include fewer or more divots than the range set forth above.

Divots 10 can cover about 10-90 percent of golf ball outer cover 5. Thus, the divots can cover at least about (or no more than about) 10, 15, 20, 25, 30, 35, 40, 45, 50, 55, 60, 65, 70, 75, 80, 85, or 90 percent of the outer surface area of golf ball 1.

In some embodiments, divots 10 can be arranged on the cover of golf ball 1 in a predetermined pattern. Any desired pattern can be used, such as (but not limited to) patterns based on geometric shapes (circles, hexagons, triangles, and the like), icosahedron, dodecahedron, octahedron, cube, or tetrahedron. In some embodiments, the divots can be patterned based on location on the ball surface (e.g., at an edge, about the circumference, etc.). However, the presently disclosed subject matter is not limited and divots 10 can be uniformly or randomly distributed on the outer surface of ball 1 (e.g., without a pattern).

Figure 6A:
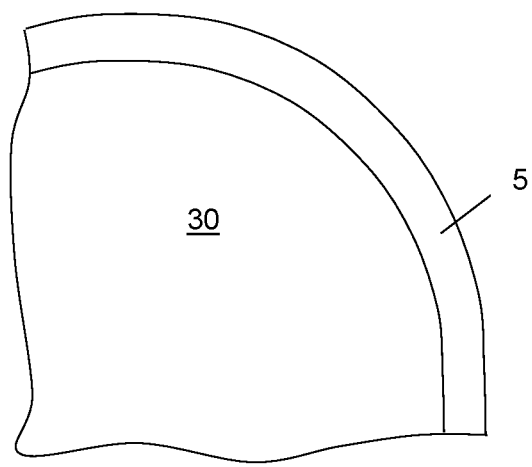
FIGS. 6a-6c are fragmentary views of a golf ball in accordance with some embodiments of the presently disclosed subject matter.

As illustrated in FIG. 6a, golf ball 1 is constructed to include cover 5 and core 30. Cover 5 forms the outer surface of the golf ball and can be formed from any desired material, including materials that are conventionally known and used. For example, suitable materials can include (but are not limited to) one or more of urethane, ionomer resin (e.g., SURLYN®, sodium ionomer resin, zinc ionomer resin, lithium ionomer resin), TPU, polybutadiene, natural or synthetic balata (trans polyisoprene), rubber, elastomeric material (e.g., polyoctenylene, butadiene, chloroprene, etc.), methacrylic acid, acrylic acid, ethylene, polyurethane, or copolymers thereof.

Cover 5 can have a thickness of about 0.001 to 0.05 inches. Thus, the cover can have a thickness of at least about (or no more than about) 0.001, 0.002, 0.003, 0.004, 0.005, 0.006, 0.007, 0.008, 0.009, 0.01, 0.011, 0.012, 0.013, 0.014, 0.015, 0.016,0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, or 0.05 inches. However, cover 5 is not limited and can be thinner or thicker than the range given above. The cover can thus have any desired thickness.

Figure 6B:
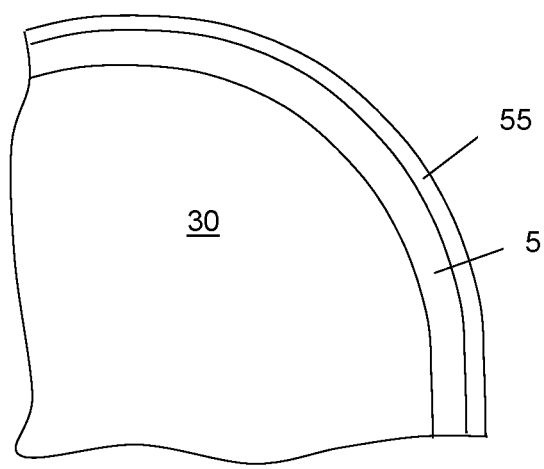

As shown in FIG. 6b, golf ball 1 can optionally include coating layer 55 applied over the exterior of ball cover 5 to provide a gloss and/or outer protective layer. The coating layer can include any suitable material, such as one or more thermoplastics, thermoplastic elastomers (such as polyurethanes, polyesters, acrylics, low acid thermoplastic ionomers, and UV curable systems). The coating layer can constitute a paint layer, a clear coat layer, or any other desired material. The thickness of coating layer 55 can range from about 5 to about 25 μm (e.g., 5, 6, 7, 8, 9, 10, 11, 12, 13, 14, 15, 16, 17, 18, 19, 20, 21, 22, 23, 24, or 25 μm). The thickness of the coating is not limited to the range given above.

The coating layer can optionally include one or more known additives, such as flow additives, slip agents, adhesion promoters, thickeners, gloss reducers, flexibilizers, cross-linking agents, isocyanates and/or other agents for toughening or creating scratch resistance, optical brighteners, UV absorbers, and the like. The amount of such additives can range from about 0 to about 5 weight percent or more.

Coating layer 55 can be applied using any known method, such as (but not limited to) spray coating, painting, dip coating, and the like. Any known method can be used.

In some embodiments, core layer 30 can be positioned directly adjacent to cover 5. Alternatively, one or more additional layers and/or materials can span the distance between the core layer and the cover, as described below.

Core layer 30 can comprise any desired material, such as (but not limited to) one or more elastomeric materials (such as rubber, polybutadiene, and the like), thermoplastic materials (e.g., ionomer resin, bi-modal ionomer resin, polyamide resin, polyester resin, polyurethane resin), and/or thermoset materials.

In some embodiments, the core layer can comprise one or more ultralightweight materials (such as aerogel) to give the core a decreased weight compared to conventional golf balls. The term "ultralightweight" refers to a material with a weight that is substantially less than conventional materials (e.g., conventional golf ball core materials). The ultralightweight material can have a weight that is 90-99.99 percent less than the conventional material. Suitable ultralightweight materials can include (but are not limited to) aerogels, Airloy®, foams, and the like.

The ultralightweight material can be used alone (e.g., the core comprises about 100% ultralightweight material or materials) or can be blended with another material (e.g., rubber, polymeric material, elastomeric material, and the like). The blends can comprise about 5-99% ultralightweight material and about 1-95% other material. Suitable polymeric materials can include (but are not limited to) one or more polyolefins, polystyrenes, polyesters, polyamides, polyethers, polyurethanes, acrylic polymers, polyimides, polyureas, polypyrroles, polythiophenes, polyanilines, acrylic polymers, vinyl polymers, polysiloxanes, polysulfides, polycarbonates, or copolymers or mixtures thereof.

The term "elastomeric" refers to a polymer exhibiting elastic properties. They include any material that upon application of a force to its relaxed, initial length can stretch or elongate to an elongated length more than 10% greater than its initial length and will substantially recover back to about its initial length upon release of the applied force. Suitable elastomeric materials can be selected from one or more of butyl rubber, styrene-butadiene rubber, nitrile rubber, chloroprene rubber, polybutadiene, polyisoprene, ethylene propylene rubber, epichlorohydrin, polyacrylic rubber, ethylene/vinyl acetate, polyether block amides, perfluoroelastomers, chlorosulfonated polyethylene, fluoroelastomers, fluorosilicone rubber, elastoefin, polysulfide rubber, resilin, elastin, thermoplastic elastomers, or combinations thereof.

The term "aerogel" refers to a synthetic porous ultralight material derived from a gel in which the liquid component of the gel has been replaced with a gas. The resultant material is a solid with extremely low density and low thermal conductivity. Suitable aerogel materials can include (but are not limited to) silica aerogel. Any type of aerogel can be used. In some embodiments, the lightweight materials can have a weight of less than about 1 gram/cc (e.g., less than about 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.009, 0.008, 0.007, 0.006, 0.005, 0.004, 0.003, 0.002, or 0.001 g/cc). However, the presently disclosed subject matter is not limited and the lightweight materials can have a density outside the range given above (e.g., greater than 1 g/cc or less than 0.001 g/cc). In some embodiments, the aerogel material can comprise about 90-99.99% air (e.g., about 99.8% air), believed to be due to the porous solid network of air pockets that take up most of the space within the material.

In some embodiments, the core layer can comprise one or more Airloy® materials (Aerogel Technologies, Boston, Mass.). Airloys® are ultralight super-insulating materials. Airloys® combine the strength of conventional polymeric materials with the low density and super-insulating characteristics of aerogels. Thus, Airloys® are strong, stiff, and tough and can be used as thermal and acoustic insulators. Airloys® are conventionally 3-10 times lighter when compared to conventional polymeric materials. In some embodiments, a suitable Airloy® has a density of about 0.01-0.9 g/cc. Airloys® can be constructed from ceramics, polymers, carbon, metals, carbides, or combinations thereof. Airloys® are generally hydrophobic and thus are stable against moisture and humidity. Airloys® can be optimized for strength-to-weight ratios in excess of 20,000:1 and can vary from strong and rigid to soft and flexible. Airloys® can be electrically insulating with dielectric constants as low as 1.1 with surface areas of 200-800 m2 g-1—orders of magnitude higher than conventional materials. Airloys® can also be made electrically conductive with specific surface areas as high as 3000 m2 g-1.

It should be appreciated that the core layer can include one or more lightweight materials in addition to (or in lieu of) the Airloy® or aerogel materials described above. The term "lightweight" material refers to a core material that weighs less than the core of a conventional golf ball. For example, a lightweight core material can have a weight about 30-99% less than a conventional golf ball core (e.g., at least/no more than about 30, 35, 40, 45, 50, 55, 60, 65, 70, 75, 80, 85, 90, 95, or 99 percent less).

In some embodiments, the core layer (or any layer) of the disclosed golf ball can comprise one or more thermally resistant materials (e.g., in the ball core, as one or more intermediate layers, in the cover, and/or as a coating). The term "thermally resistant" refers to any material that resists a change in temperature. A thermally resistant material can be measured by a temperature difference by which an object or material resists a heat (or cooling) flow. Thermal resistance is the reciprocal of thermal conductance. It should be appreciated that any thermally resistant material that can be housed within the interior of a golf ball can be used and is within the scope of the presently disclosed subject matter. Suitable thermally resistant materials can include the aerogel and Airloy® materials described above, and/or one or more of polyurethane foam, expanded polystyrene, spray foam, closed cell foam, polyisocyanurate, PE foam, plastic foam, polystyrene foam, plastic, rubber, and/or any material that resists a change in temperature.

The core can have any desired diameter, such as about 1.25 to about 1.5 inches. Thus, core 30 can have a diameter of at least about (or no more than about) 1.25, 1.26, 1.27, 1.28, 1.29, 1.3, 1.31, 1.32, 1.33, 1.34, 1.35, 1.36, 1.37, 138, 1.39, 1.4, 1.41, 1.42, 1.43, 1.44, 1.45, 1.46, 1.47, 1.48, 1.49, or 1.5 inches. In some embodiments, the core diameter can be larger or smaller than the range given above.

Figure 6C:
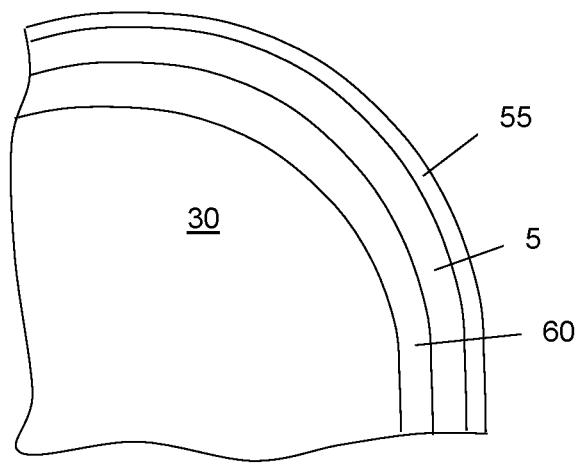

In some embodiments, ball 1 can include one or more intermediate layers positioned between core 30 and cover 5. For example, as shown in FIG. 6c, golf ball 1 can include at least one intermediate layer 60 constructed from any desired material. In some embodiments, intermediate layer 60 can include a relatively hard material to help decrease backspin and the tendency of the ball to deform. Alternatively, the intermediate layer can include a relative soft material to increase backspin, if desired. Such materials are well known in the art. Any number of intermediate layers can be used.

Figure 6D:
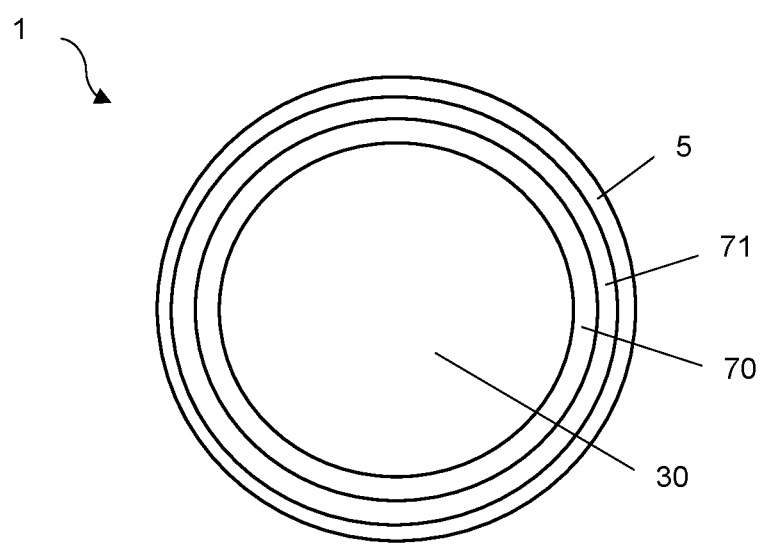
FIG. 6d is a cross-sectional view of a golf ball in accordance with some embodiments of the presently disclosed subject matter.

In some embodiments, the presently disclosed subject matter is directed to a golf ball comprising a central core layer 30, an outer layer 5, and first and second intermediate layers 70, 71 positioned between the core layer and the outer layer, as shown in FIG. 6d. In some embodiments, first intermediate layer 70 is positioned adjacent or directly adjacent to central core layer 30 and second intermediate layer 71. In some embodiments, the second intermediate layer is positioned adjacent or directly adjacent to first intermediate layer 70 and outer layer 5. The term "adjacent" refers to the positioning of two layers either in contact with one another without any intervening layer or with a tie layer, adhesive layer, and/or other layer therebetween. The term "directly adjacent" refers to adjacent layers that are in contact with another layer without any tie layer, adhesive, or other layer therebetween.

The core layer of the golf ball of FIG. 6d can have any desired diameter, such as about 0.5 to about 1.5 inches. Thus, core 30 can have a diameter of at least about (or no more than about) 0.5, 0.55, 0.6, 0.65, 0.7, 0.75, 0.8, 0.85, 0.9, 0.95, 1.0, 1.05, 1.10, 1.15, 1.120, 1.25, 1.26, 1.27, 1.28, 1.29, 1.3, 1.31, 1.32, 1.33, 1.34, 1.35, 1.36, 1.37, 138, 1.39, 1.4, 1.41, 1.42, 1.43, 1.44, 1.45, 1.46, 1.47, 1.48, 1.49, or 1.5 inches. In some embodiments, the core diameter can be larger or smaller than the range given above.

The first intermediate layer is positioned between the core layer and the second intermediate layer. The first intermediate layer can include any known material, such as (but not limited to) materials suitable for use with cover 5. For example, suitable materials can include (but are not limited to) one or more of urethane, ionomer resin (e.g., SURLYN®, sodium ionomer resin, zinc ionomer resin, lithium ionomer resin), TPU, polybutadiene, natural or synthetic balata (trans polyisoprene), rubber, elastomeric material (e.g., polyoctenylene, butadiene, chloroprene, etc.), methacrylic acid, acrylic acid, ethylene, polyurethane, or copolymers thereof.

The second intermediate layer is positioned between the first intermediate layer and the outer layer (cover). The second intermediate layer can include any known material, such as (but not limited to) one or more elastomeric materials (such as rubber, polybutadiene, and the like), thermoplastic materials (e.g., ionomer resin, bi-modal ionomer resin, polyamide resin, polyester resin, polyurethane resin), Airloy®, and/or thermoset materials.

In some embodiments, the first and/or second intermediate layer can comprise one or more lightweight materials (such as aerogel) to give the core a decreased weight compared to conventional golf balls. In some embodiments, the lightweight materials can have a weight of less than about 1 gram/cc (e.g., less than about 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.009, 0.008, 0.007, 0.006, 0.005, 0.004, 0.003, 0.002, or 0.001 g/cc). However, the presently disclosed subject matter is not limited and the lightweight materials can have a density outside the range given above (e.g., greater than 1 g/cc or less than 0.001 g/cc).

The first and/or second intermediate layers can have a thickness of about 0.01 to 1.0 inches. Thus, the cover can have a thickness of at least about (or no more than about) 0.01, 0.011, 0.012, 0.013, 0.014, 0.015, 0.016, 0.017, 0.018, 0.019, 0.02, 0.025, 0.03, 0.035, 0.04, 0.045, 0.05, 0.55, 0.6, 0.65, 0.7, 0.75, 0.8, 0.85, 0.9, 0.95, or 1 inches. However, thickness of the first intermediate layer is not limited and can be thinner or thicker than the range given above.

The golf ball can further include an outer (cover) layer as described herein above. The golf ball can optionally include a coating layer applied over the exterior of the ball cover to provide a gloss and/or outer protective layer. The coating layer can include any suitable material, such as one or more thermoplastics, thermoplastic elastomers (such as polyurethanes, polyesters, acrylics, low acid thermoplastic ionomers, and UV curable systems).

The coating layer can optionally include one or more known additives, such as flow additives, slip agents, adhesion promoters, thickeners, gloss reducers, flexibilizers, cross-linking agents, isocyanates and/or other agents for toughening or creating scratch resistance, optical brighteners, UV absorbers, and the like. The amount of such additives can range from about 0 to about 5 weight percent or more.

In some embodiments, the golf ball can include one or more intermediate layers positioned between any of the disclosed layers. The intermediate layer(s) can be constructed from any desired material. Any number of intermediate layers can be used.

Figure 7:
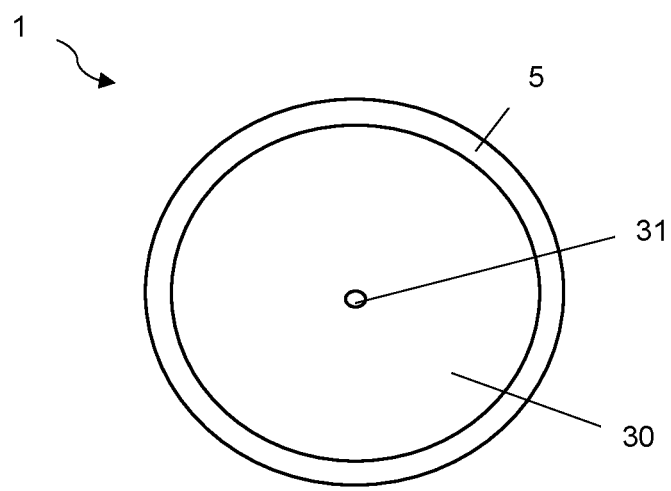
FIG. 7 is a cross-sectional view of a golf ball with a central core portion.

In some embodiments, the core layer can comprise a solid portion 31 positioned at the approximate center of the golf ball as shown in FIG. 7. In some embodiments, the solid portion can add weight to ball 1, allowing the ball to fly better and provides additional wind resistance. The solid portion can be formed from any solid material, such as (but not limited to) wood, metal (e.g., stainless steel, aluminium, brass, copper), ceramics, plastic, or combinations thereof. In some embodiments, the solid portion can be configured as a ball bearing, although it can have any shape or size. For example, solid portion 31 can be circular, oval, rectangular, square, hourglass, diamond, triangular, etc. in shape. The solid portion can have any desired diameter, such as about 0.001-0.5 inches (e.g., at least/no more than about 0.001, 0.005, 0.01, 0.02, 0.03, 0.04, 0.05, 0.06, 0.07, 0.08, 0.09, 0.1, 0.2, 0.3, 0.4, or 0.5 inches). However, the presently disclosed subject matter and the solid portion diameter can be greater or less than the range given herein.

Golf ball 1 can be produced using any known method. For example, core 30 can constructed using a conventional molding operation, such as compression molding, hot press molding, injection molding, or other procedures as are known and used in the art. In other embodiments, the core can be constructed using a sol-gel process to create an aerogel core structure. In some embodiments, the core can include one or more additives, including those conventionally known and used in the golf ball art.

Optionally, one or more intermediate layers 60 can be formed over core 30 by molding or lamination processes, such as injection molding. The intermediate layers, when present, can have any desired physical property (e.g., COR, density, thickness, hardness, etc.). Cover 5 can then be formed around the golf ball interior (e.g., core 30 and any intermediate layers 60). The core (and optional intermediate layers) can be supported within a pair of cover mold-halves by a plurality of retractable pins. The retractable pins can be actuated by conventional methods known to those of ordinary skill in the art. After the mold halves are closed together, the cover material can be injected into the mold in a liquid or flowable state through a plurality of injection ports or gates. The mold halves can include structures that result in the formation of divots 10 in the cover. The cover material can then solidify around the ball interior, and the produced golf ball is then ejected from the mold halves. However, any known method of making a golf ball with one or more intermediate layers can be used.

Thus, it should be appreciated that the method of making golf ball 1 is not limited. For example, in some embodiments, the golf ball cover can be formed by casting procedures, e.g., as conventionally known and used in the art.

In some embodiments, a finishing process can be applied to cover 5, such as the additional of paint and/or one or more coating layers 55. Golf ball 1 can thus be constructed in any desired color, such as white, black, red, blue, purple, pink, orange, yellow, green, brown, or combinations thereof.

In some embodiments, printing can be applied to the golf ball outer surface. Any desired printing technique can be used, including pad printing, ink jet printing, and/or other printing techniques that are conventionally known and used in the art.

The produced golf ball is symmetrical in shape. The term "symmetrical" refers to the characteristic of being divided into two or more identical pieces that are arranged in an organized fashion. In some embodiments, ball 1 has rotational symmetry and can be rotated about a fixed point without changing the overall shape.

In some embodiments, ball 1 can have a minimum diameter of about 1.68 inches, such as at least about (or no more than about) 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99 or 2.00 inches. The term "diameter" refers to the distance of a straight-line segment passing through the center of a golf ball.

In some embodiments, ball 1 can have a weight of no more than about 1.62 ounces. For example, the ball can have a weight of at least about (or no more than about) 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, or 1.62 ounces.

However, the presently disclosed subject matter is not limited and golf ball 1 can have a weight and/or minimum diameter greater or lesser than the ranges given above. Thus, the golf ball can have any desired weight and any desired minimum diameter.

In some embodiments, golf ball 1 conforms to the United States Golf Association (USGA) standards for golf equipment. To this end, the disclosed golf ball can be spherically symmetric, weigh 1.620 ounces or less, have a diameter of 1.680 inches or more, and have a symmetrical divot pattern. The standards further require that the total distance of a golf ball not be greater than 317 yards, with a tolerance of 3 yards. The full list of golf ball standards is compiled in the USGA's *Equipment Rules* found at usga.org, incorporated by reference herein in its entirety.

During use, the flight path of a golf ball is determined by many factors. Several of the factors can be controlled to some extent by the golfer, such as the ball's velocity, launch angle, spin rate, and spin axis. Other factors are controlled by the design of the ball, including the ball's weight, size, materials of construction, and aerodynamic properties.

The aerodynamic force acting on a golf ball during flight can be broken down into three separate force vectors: lift, drag, and gravity. The lift force vector acts in the direction determined by the cross product of the spin vector and the velocity vector. The drag force vector acts in the direction opposite of the velocity vector. The spin rate of a ball is measured in two main ways, as these different types of spin have different impacts on the flight of the ball. The spin of the ball against the direction of flight is known as "back spin". Any spin to the ball that is oriented at an angle to the direction of flight is "side spin". Back spin generally affects the distance of the ball's flight. Side spin generally affects the direction of the ball's flight path.

The spin rate of the ball generally refers to the speed that the ball turns about an axis through the center of the ball. The spin rate of the ball is typically measured in revolutions per minute. Because the spin of the ball generates lift, the spin rate of the ball directly impacts the trajectory of the ball. A shot with a high spin rate flies to a higher altitude than a ball with a low spin rate. Because the ball flies high with high spin, the overall distance traveled by a ball hit with excessive spin is less than a ball hit with an ideal amount of spin. A ball hit with insufficient spin will not generate enough lift to increase the carry distance, resulting in a serious loss of distance. Therefore, hitting a ball with the ideal amount of spin can maximize the distance traveled by the ball.

In some embodiments, the divots and/or core of the disclosed golf ball prevents and/or reduces hooking and/or slicing. Hooking and slicing result in a significant right-to-left curving or left-to-right curving of the flight of a golf ball. In some embodiments, a hook occurs when the golf club face is closed relative to the swing path or with an inside-out swing path. As a result, the golf ball curves from right to left for a right-handed player, or vice versa for a left-handed player (although the presently disclosed subject matter is not limited). In some embodiments, a slice occurs when the club face is open relative to the swing path or with an outside-in swing path. As a result, the ball curves from left to right for a right-handed player or vice versa for a left handed player (although the presently disclosed subject matter is not limited). In some embodiments, the hooking and/or slicing can be fully eliminated (e.g., 100%). In other embodiments, the rate of hooking and/or slicing can be reduced by about 1-99 percent compared to conventional golf balls. Therefore, the amount of hooking and/or slicing can be reduced by at least (or no more than) about 1, 5, 10, 15, 20, 25, 30, 35, 40, 45, 50, 55, 60, 65, 70, 75, 80, 85, 90, 95, 99, or 100 percent.

In addition to affecting the shape of the flight path and/or trajectory of a ball, the spin of a golf ball can also affect the run of the ball, i.e., the distance a ball rolls once the ball hits the ground. Balls with a high spin rate stop sooner than balls hit with a low spin rate. In other words, the run of the ball is lower with a high-spin ball than with a low-spin ball. Therefore, on shots where control is more important than distance, such as approach shots, a high spin is generally preferred.

While a golfer's club and technique play large roles in providing spin to the ball, the ball itself has characteristics that affect the spin rate of the ball. A ball with a soft cover material, such as balata, will achieve a greater level of back spin than a ball with a hard cover. However, balls with soft cover materials are generally more expensive, less durable, and more difficult to play than balls with harder covers. Balls with hard cover materials, such as Surlyn®, are less expensive, but average golfers may find the spin on such balls hard to maximize or difficult to control.

Advantageously, ball 1 exhibits improved performance when compared to prior art golf balls. Specifically, in some embodiments the divot design tends to increase lift and decrease drag as the ball flies through the air, allowing the ball to have a higher trajectory and often a longer flight time. In other words, the divots help pick up the ball and prevents wind or air from turning the ball trajectory. As a result, the ball tends to go farther than prior art golf balls. Thus, it has been determined that a golf ball with a divot design that includes an indentation surrounding a raised central portion exhibits decreased drag and/or increased lift.

In some embodiments, the lightweight core of golf ball 1 can improve flight characteristics. Particularly, the combination of a soft and lightweight core with a hard cover leads to an improved golf ball having lower than anticipated spin rate, with high resiliency and durable characteristics necessary for improved play. The lightweight materials can also impart an increased bounciness to the golf ball. In addition, the core materials can provide temperature resistance to the golf ball. It has been established that golf balls travel further at warmer temperatures due to the expansion and flexibility of the core materials (e.g., rubber). However, during cold temperatures, prior art golf balls are less flexible and thus travel shorter distances. The lightweight materials of core 30 can provide temperature resistance to golf ball 1, thereby eliminating the fluctuations in ball flight.

The combination of the core materials and divots (or each element alone) also can create greater control, allowing for straighter ball flight.

In some embodiments, the disclosed divots are optional and conventional divots can be used. "Conventional divots" refers to the type, size, and/or shape of the divots that appear on at least some prior art golf balls. Thus, the presently disclosed subject matter can include a golf ball comprising a cover and a core as disclosed herein above. Specifically, the core can be formed from one or more lightweight materials, such as aerogel to give the core (and/or ball) a decreased weight compared to conventional golf balls. The core can have a diameter of about 1.0-1.5 inches. In some embodiments, the ball can include one or more intermediate layers as described above.

What is claimed is:

1. A golf ball comprising:
an inner core comprising about 100 weight % of ultra-lightweight material selected from aerogel or silica aerogel; and
a substantially spherical outer cover comprising a plurality of divots.

2. The golf ball of claim 1, wherein the ultralightweight material has a density of less than about 1 g/cc.

3. The golf ball of claim 1, wherein the ultralightweight material comprises greater than 99 weight % air, based on the total weight of the inner core.

4. The golf ball of claim 1, wherein the core layer comprises one or more thermally resistant materials.

5. The golf ball of claim 1, further comprising first and second intermediate layers positioned between the core layer and the outer cover, wherein the first and second intermediate layers comprise one or more of the following urethane, ionomer resin, TPU, polybutadiene, natural or synthetic balata, rubber, elastomeric material, methacrylic acid, acrylic acid, ethylene, polyurethane, polyamide resin, polyester resin, polyurethane resin, aerogel, ultralight super-insulating materials with a density of about 0.01-0.9 g/cc, thermoset materials, or combinations thereof.

6. The golf ball of claim 5, wherein the first and second intermediate layers have a thickness of about 0.01-1.0 inches.

7. The golf ball of claim 1, wherein the outer cover comprises one or more of urethane, sodium ionomer resin, zinc ionomer resin, lithium ionomer resin, thermoplastic polyurethane (TPU), polybutadiene, natural or synthetic balata (trans polyisoprene), rubber, polyoctenylene, butadiene, chloroprene, methacrylic acid, acrylic acid, ethylene, polyurethane, or copolymers thereof.

8. The golf ball of claim 1, wherein the outer cover has a thickness of about 0.01-0.05 inches.

9. The golf ball of claim 1, wherein the divots each comprise an indentation and a land portion that is level with the outer cover of the golf ball.

10. The golf ball of claim 1,
wherein the outer cover comprises a plurality of divots, each divot defined by a circular indentation surrounding a raised central stem that is flush with the outer cover;
wherein each indentation is configured with an inner edge positioned adjacent to the cover of the golf ball, and an outer edge positioned adjacent to the raised central stem, both the inner edge and outer edges configured as straight-line segments that extend into the interior core of the golf ball.

11. The golf ball of claim 10, wherein the indentation has a depth of about 0.005 to about 0.04 inches.

12. The golf ball of claim 10, wherein the stem is circular in shape.

13. The golf ball of claim 10, wherein each indentation inner edge, outer edge, or both comprises a right angle relative to the cover of the golf ball.

14. The golf ball of claim 10, wherein each indentation inner edge, outer edge, or both comprises an acute or obtuse angle relative to the cover of the golf ball.

15. A method of making a golf ball, the method comprising:
forming a spherical inner core comprising about 100 weight % of one or more ultralightweight materials selected from aerogel or silica aerogel;
optionally forming one or more intermediate layers around the inner core layer using a molding or lamination process;
inserting the structure into a mold comprising a desired divot pattern;
injecting the mold with an outer cover material;
cooling the cover material; and
ejecting the golf ball from the mold.

16. The method of claim 15, wherein the cover comprises one or more of urethane, sodium ionomer resin, zinc ionomer resin, lithium ionomer resin, thermoplastic polyurethane (TPU), polybutadiene, natural or synthetic balata (trans polyisoprene), rubber, polyoctenylene, butadiene, chloroprene, methacrylic acid, acrylic acid, ethylene, polyurethane, or copolymers thereof.

17. The method of claim 15, wherein the divots each comprise an indentation and a land portion that is level with the outer cover of the golf ball, wherein each indentation is configured with an inner edge positioned adjacent to the cover of the golf ball, and an outer edge positioned adjacent to a raised central stem, both the inner edge and outer edges configured as straight-line segments that extend into the interior core of the golf ball.

* * * * *